United States Patent [19]
Schuster et al.

[11] Patent Number: 6,062,887
[45] Date of Patent: May 16, 2000

[54] ELECTRONIC DEVICE WITH DUAL CARD READER EMPLOYING A DRAWER

[75] Inventors: David C. Schuster, Buffalo Grove; Robert J. Stinauer, II, Arlington Hts.; Tobin C. Laursen, Evanston, all of Ill.

[73] Assignee: Motorola, Inc., Schaumburg, Ill.

[21] Appl. No.: 09/144,157

[22] Filed: Aug. 31, 1998

[51] Int. Cl.[7] .................................................. H01R 23/70
[52] U.S. Cl. ........................................... 439/218; 439/630
[58] Field of Search ..................................... 439/218, 630

[56] References Cited

U.S. PATENT DOCUMENTS

| | | | |
|---|---|---|---|
| 3,555,247 | 1/1971 | Gruczelak | 235/61.11 |
| 4,900,272 | 2/1990 | Lange et al. | 439/630 |
| 5,269,707 | 12/1993 | Reichardt et al. | 439/630 |
| 5,320,552 | 6/1994 | Reichardt et al. | 439/331 |
| 5,586,890 | 12/1996 | Braun | 439/66 |
| 5,599,203 | 2/1997 | Broschard | 439/630 |
| 5,653,610 | 8/1997 | Broschard | 439/630 |
| 5,729,591 | 3/1998 | Bailey | 379/59 |
| 5,748,737 | 5/1998 | Daggar | 380/24 |

OTHER PUBLICATIONS

Brogan et al., "Dual Card and Method Therefor", U.S.S.N. 08/399,689, filed May 6, 1995, Attorney Docket No. CE01162R.
SanDisk MMC–MultiMediaCard web pages from http://www.sandisk.com, "Introducing a New Standard in Data Storage" (4 pages), "Background Applications Report" (3 pages) and Product Overview (3 pages), Aug. 19, 1998.

*Primary Examiner*—Steven L. Stephan
*Assistant Examiner*—Chandrika Prasad
*Attorney, Agent, or Firm*—Mark D. Patrick

[57] ABSTRACT

To accommodate two different electronic cards, such as a subscriber identity card and a flash memory card, in an electronic device (100), such as a cellular telephone, a dual card reader (214) is employed. The dual card reader (214) has a reader housing (222) and two sets of contacts (410 and 412) carried on the reader housing (222). The dual card reader (214) further has a drawer (224) adapted for receipt by the reader housing (222). The drawer (224) is further adapted to receive a first electronic card (300) having a first size and a second electronic card (302) having a second size different from the first size.

20 Claims, 13 Drawing Sheets

6,062,887

ELECTRONIC DEVICE WITH DUAL CARD READER EMPLOYING A DRAWER

FIELD OF THE INVENTION

The present invention relates to electronic cards and, more particularly, to card readers employed by electronic devices to interface to electronic cards.

BACKGROUND OF THE INVENTION

Electronic cards are used to transport information used in the operation of electronic devices. For example, a subscriber identity module (SIM) card is used with a cellular telephone to provide subscriber identification information to the cellular telephone. In a cellular system requiring use of SIM cards, such as the Global System for Mobiles (GSM) system, a user's subscriber account identification information is stored on his or her SIM card rather than within the cellular telephone. This is beneficial because any cellular telephone configured to receive a SIM card may be operated by the user under his or her account. Another type of electronic card is a flash memory card, such as the Multi-MediaCard (MMC) manufactured by Sandisk. A flash memory card may be used with a cellular telephone to expand the functionality and capability thereof. In particular, the flash memory card may be used to store the entire phone book of a major city, to store the complete text of news stories transmitted to the cellular phone, to store voice recognition features, to function as a voice recorder, and to function as a personal organizer.

To accommodate and utilize an electronic card, such as a SIM card or a flash memory card, the cellular telephone employs a card reader to electrically and mechanically interface to the card. To ensure reliable connectivity, the card reader must secure the card to the device. In order to secure the card, the card reader must necessarily be larger in size than the card. This is clearly exemplified by, for example, the SIM card card reader of U.S. Pat. No. 5,269,707 or U.S. Pat. No. 5,320,552. While benefiting from the increased functionality and capability described above, a cellular phone with two card readers (one for the SIM card and the other for the flash memory card) will exhibit an increased size or volume. This is unfortunate as those cellular telephones with small volumes and compact form factors often enjoy the greatest commercial success.

Therefore, what is needed is a way to accommodate two different electronic cards, such as a SIM card and a flash memory card, in an electronic device, such as a cellular telephone, with no, or only minimal, increase in volume or form factor of the electronic device.

DETAILED DESCRIPTION OF THE PREFERRED EMBODIMENTS

Figure 1:
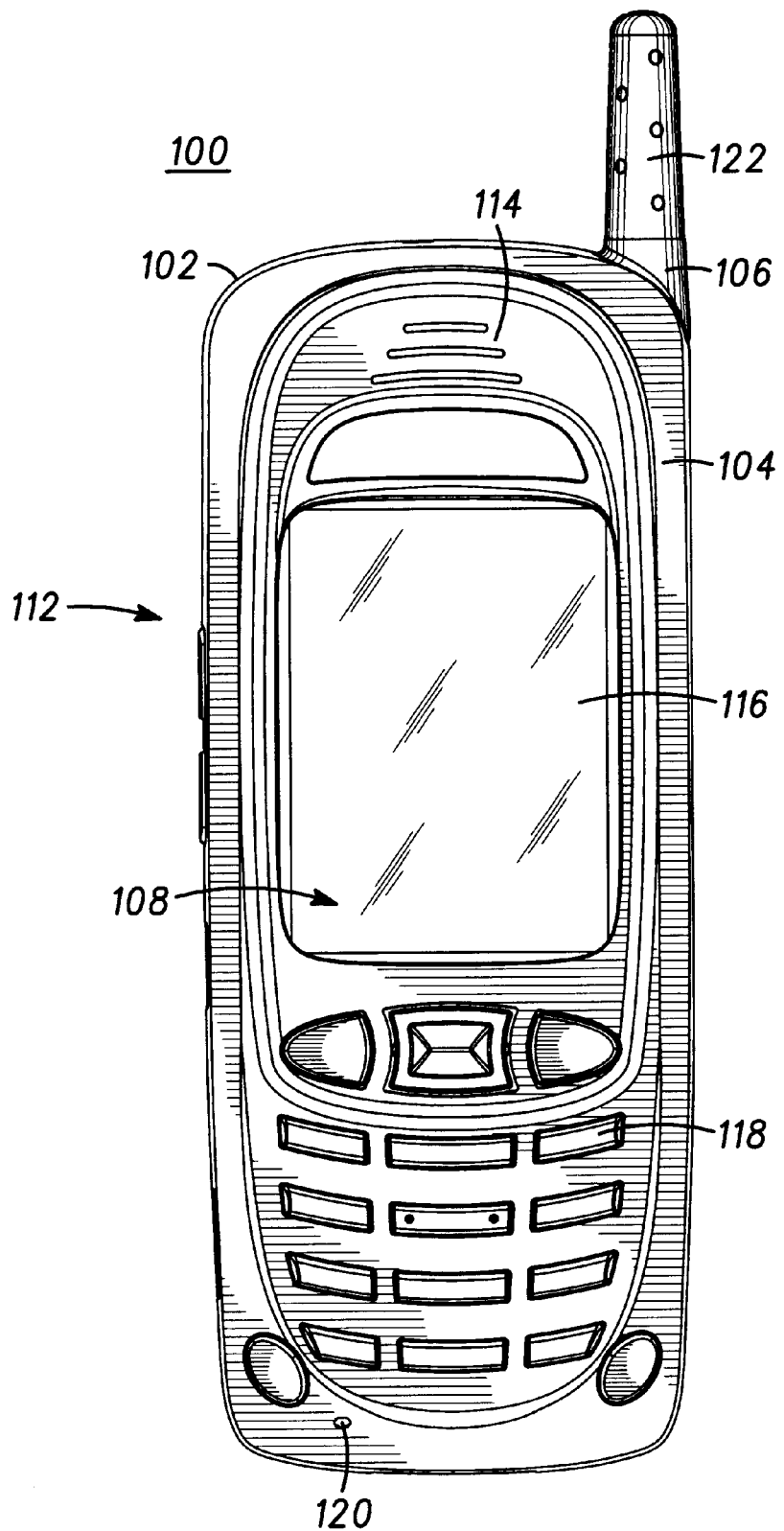
FIG. 1 is a front elevation view of an electronic device having a dual card reader employing a drawer.

To accommodate two different electronic cards, such as a subscriber identity card and a flash memory card, in an electronic device, such as a cellular telephone, a dual card reader is employed. The dual card reader has a reader housing and two sets of contacts carried on the reader housing. The dual card reader further has a drawer adapted for receipt by the reader housing. The drawer is further adapted to receive a first electronic card having a first size and a second electronic card having a second size different from the first size. The dual card reader, as described, avoids the use of two separate readers and, thereby, minimizes unnecessary waste of valuable electronic device volume. This is particularly true in those instances where the electronic device already requires use of one electronic card as in the case of GSM cellular telephones, which require use of a subscriber identity card known as a subscriber identity module (SIM) card.

An electronic device 100 is shown in FIGS. 1–4 as a cellular telephone. The device 100 has a device housing 102 formed from front and rear housing portions 104 and 106 matable along junction 200 to enclose a circuit board 202 of the device 100. A longitudinally extending front surface 108 of the front housing portion 104 carries a user interface 112 defined by a speaker 114, a display 116, a keypad 118 and a microphone 120. An antenna 122 is carried on the rear housing portion 106 at a top of the device 100. The rear housing portion 106 has a battery pack mating site 204 to detachably connect a battery pack 206 to the device 100. The battery pack mating site 204 employs a recess 208 having a depth 210 substantially equal to a thickness 212 of the battery pack 206 such that, upon connection, the battery pack 206 and the rear housing portion 106 adjacent to the recess 208 form a substantially continuous, planar surface. A side wall 218 of the recess 208 carries battery contacts 220 that, upon connection, electrically couple to mating contacts of the battery pack 206 to permit powering of the device 100 from the battery pack 206.

Figure 3:
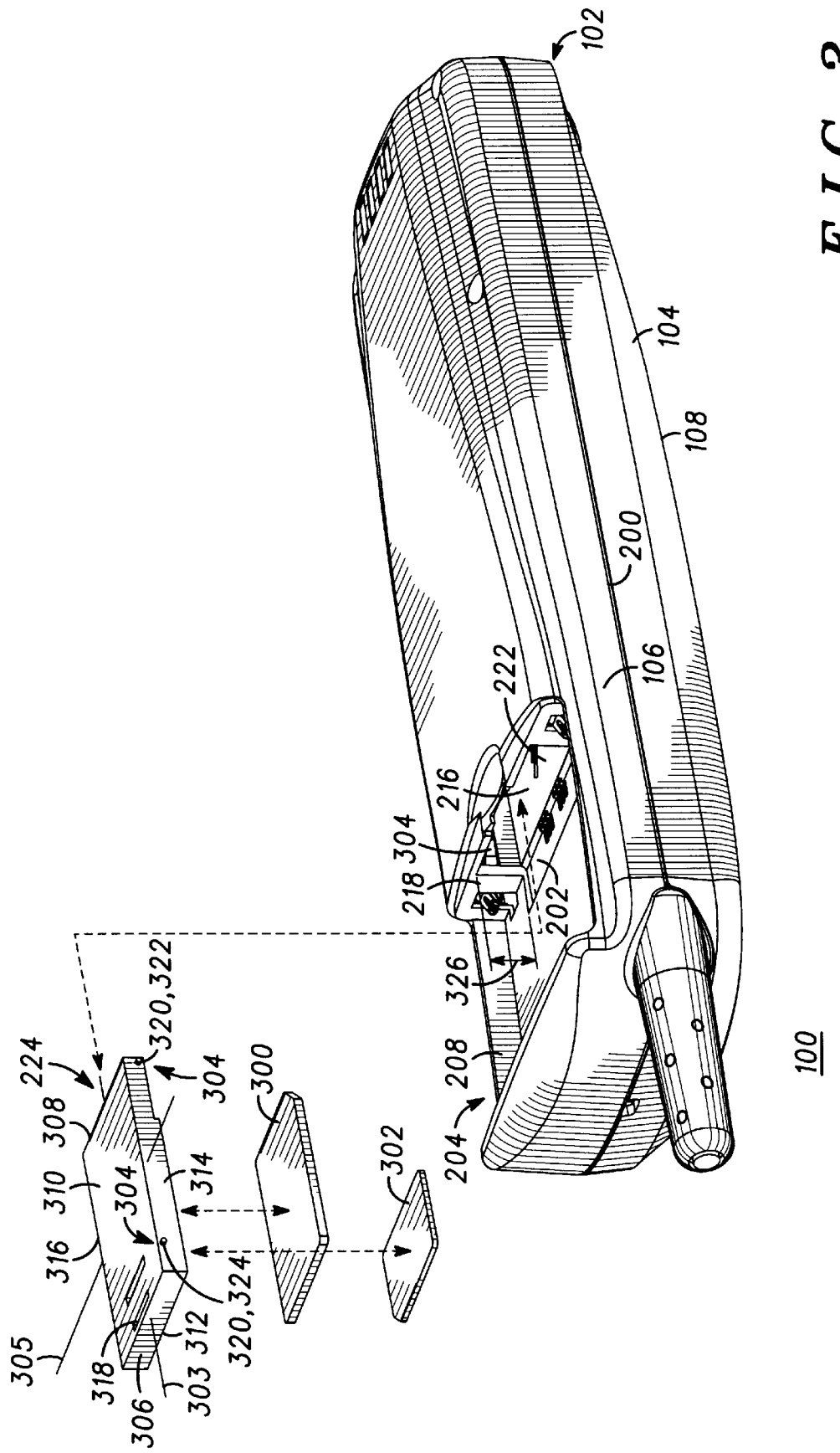
FIG. 3 is a rear perspective view of the electronic device without the battery pack and showing, from a top perspective, the drawer removed from the dual card reader and electronic cards removed from the drawer.
Figure 6:
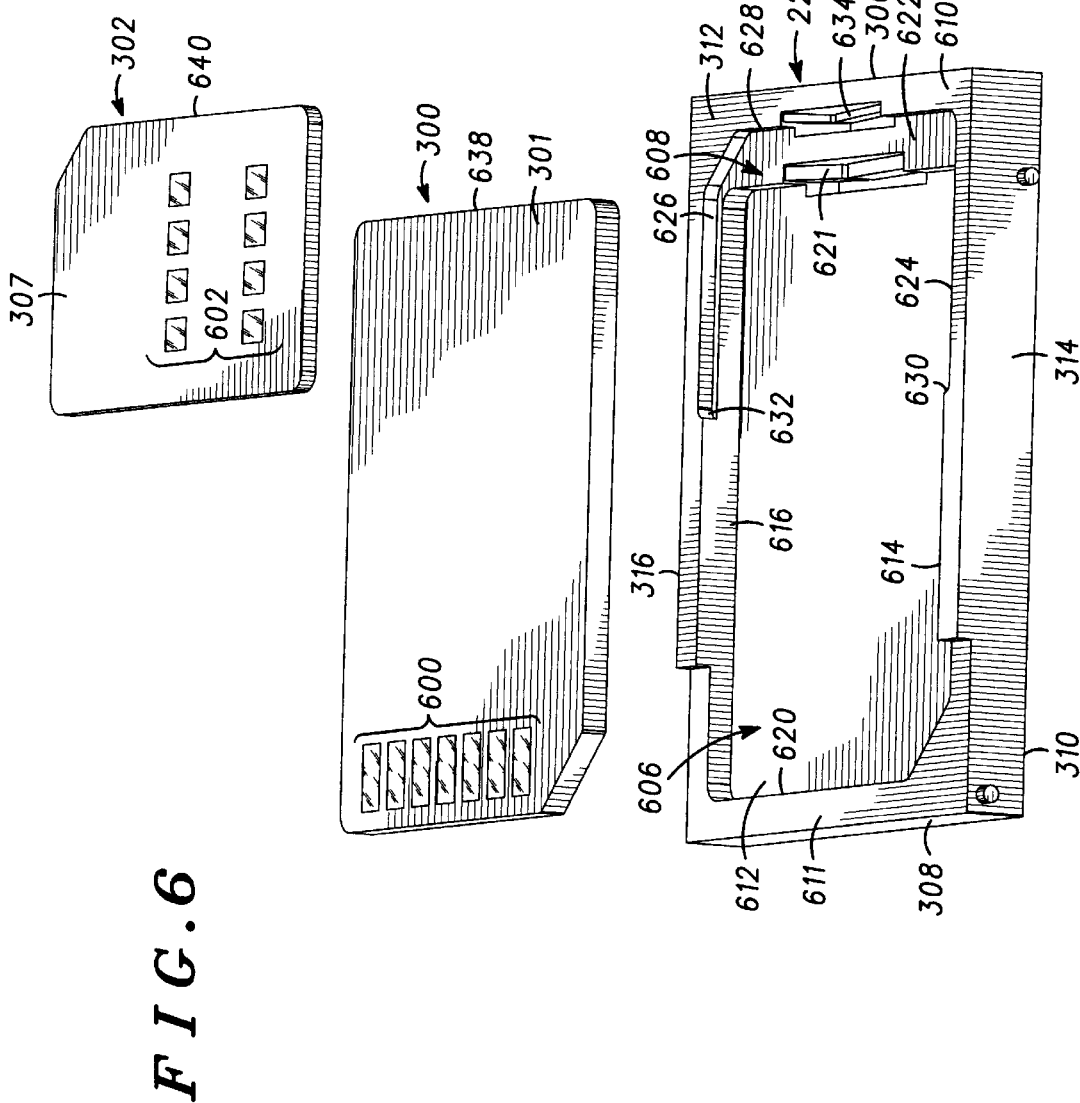
FIG. 6 is a view, from a bottom perspective, of the drawer and the electronic cards removed from the drawer.
Figure 7:
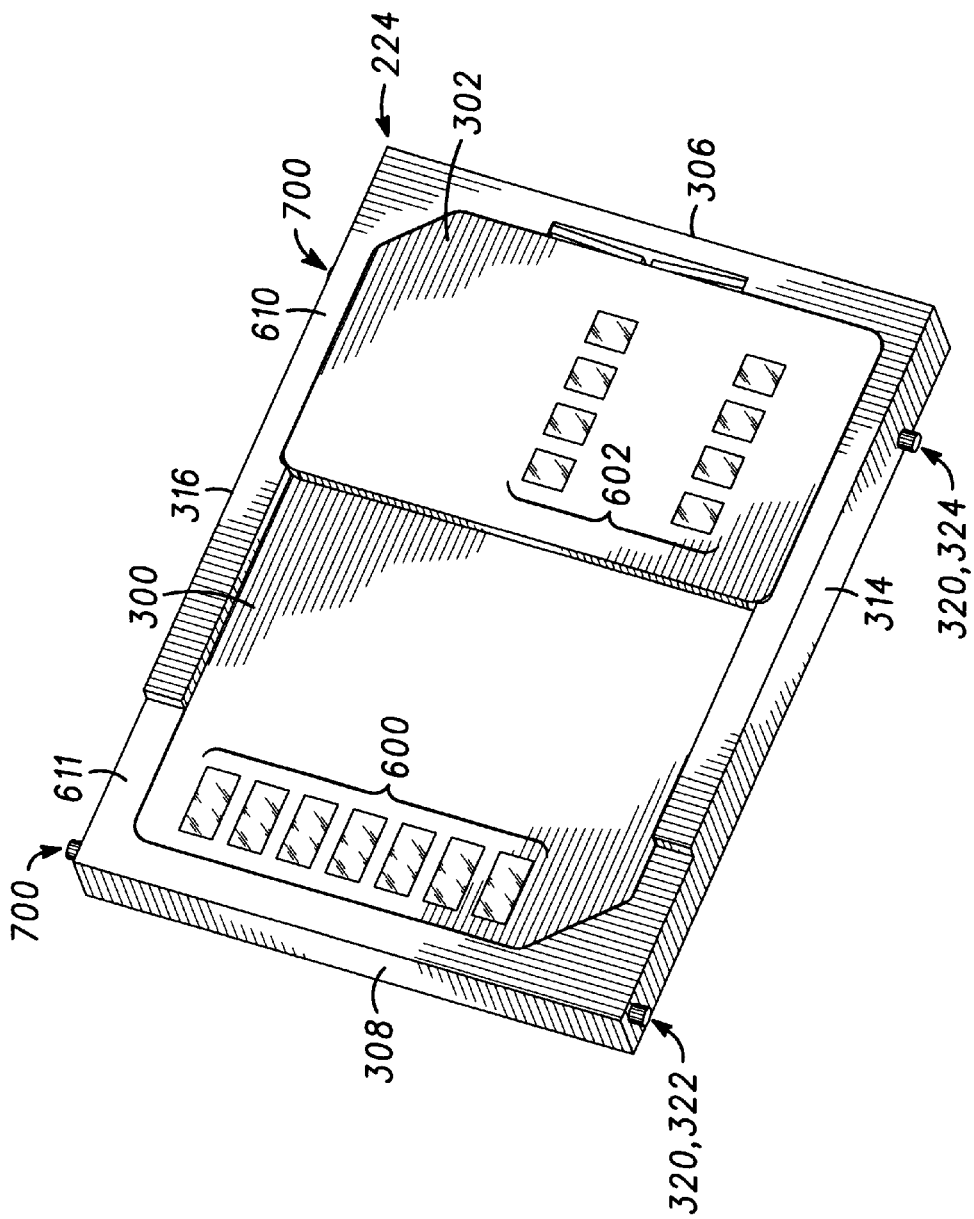
FIG. 7 is a view, from a third perspective, of the drawer and the electronic cards received in the drawer.

The device 100 employs a dual card reader 214 for reading differently sized electronic cards 300 and 302. The electronic card 300, as shown in FIGS. 3, 6 and 7, is preferably a flash memory card such as the MultiMediaCard (MMC) manufactured by Sandisk. The electronic card 300 has a housing 301 containing a memory 1100 (see FIG. 11) with a size on the order of megabytes (e.g., 2 MB, 4 MB or 8 MB) so as to be suitable for storing large amounts of textual information or application programming. A set of metallic pads 600 is carried on the housing 301 to facilitate external access to the memory 1100. In the illustrated embodiment, the housing 301 is dimensioned to have a length of 32 mm, a width of 24 mm and a thickness of 1.4 mm; and the set of pads 600 is a set of seven pads arranged in a single row.

The electronic card 302, as shown in FIGS. 3, 6 and 7, is preferably a subscriber identity card such as the plug-in SIM card defined in the GSM Specification 11.11—version 3.15.0. The electronic card 302 has a housing 307 containing a microprocessor 1102 (see FIG. 11) and electronically erasable programmable read only memory (EEPROM) 1104 for storing user subscriber account identification information. A set of metallic pads 602 is carried on the housing 307 to facilitate external access to the microprocessor 1102. In the illustrated embodiment, the housing 307 is dimensioned to have a length of 25 mm, a width of 15 mm and a thickness of 0.8 mm; and the set of pads 602 is a set of eight pads arranged in two rows of four.

Figure 2:
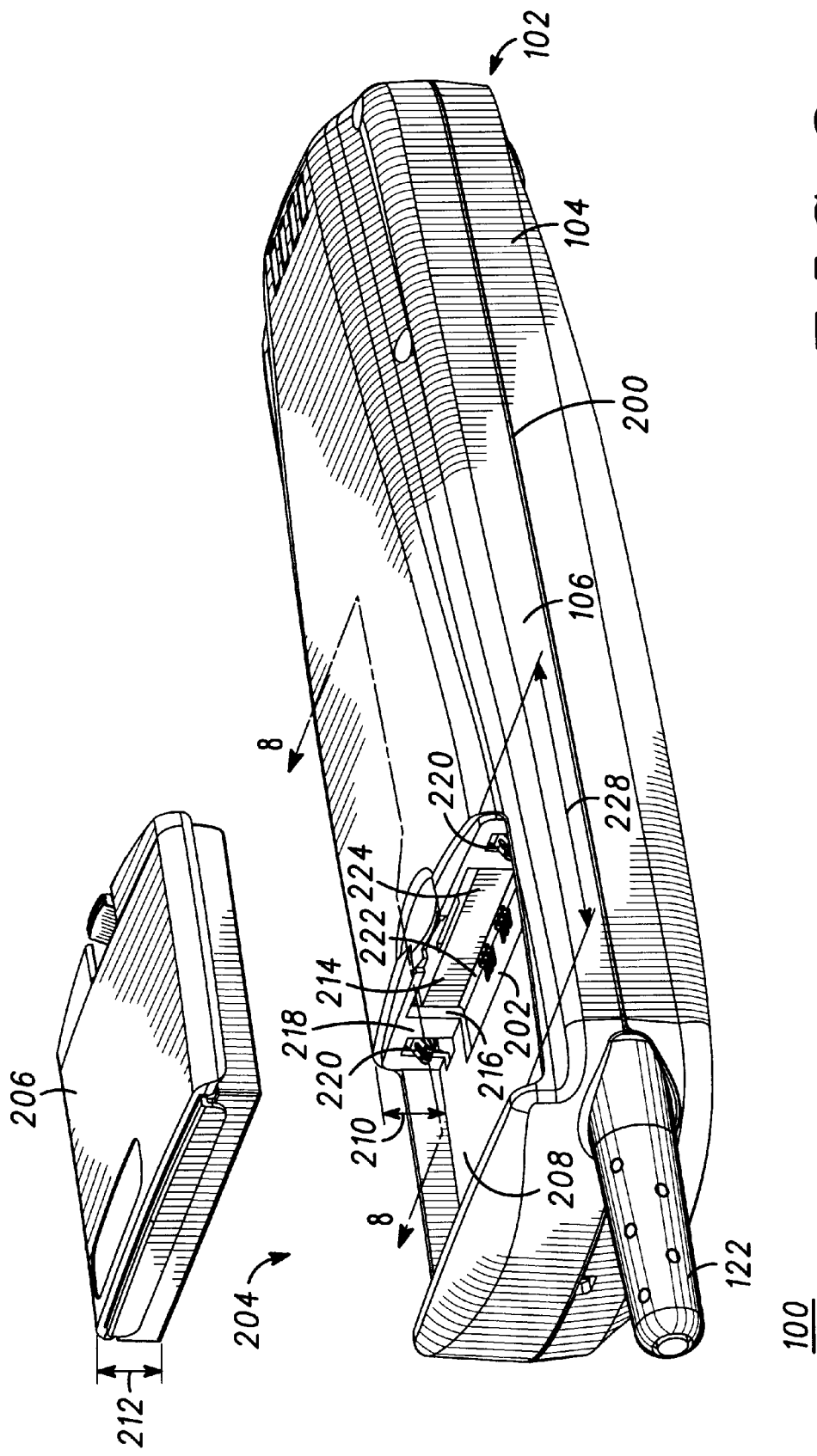
FIG. 2 is a rear perspective view of the electronic device showing a battery pack removed therefrom to reveal the dual card reader employing a drawer.

As shown in FIGS. 2 and 3, the dual card reader 214 is mounted on the circuit board 202 behind a slot 216 formed in the rear housing portion 106. In particular, the slot 216 extends through the side wall 218 of the recess 208 between the battery contacts 220. The dual card reader 214 has a reader housing 222, a drawer 224 adapted to receive the electronic cards 300 and 302 and a track assembly 304 for slidably engaging the drawer 224 and the reader housing 222. In FIG. 2, the drawer 224 and the reader housing 222 are shown in an engaged position. In the engaged position, any of the electronic cards 300 and 302 received in the drawer 224 are electrically connected to the device 100. To achieve a disengaged position as shown in FIG. 3 in which the drawer 224 is removed, the drawer 224 is pulled away from the reader housing 222 into the recess 208 via the slot 216 and, thereafter, lifted out of the recess 208. In the disengaged position, any of the electronic cards 300 and 302 received in the drawer 224 are electrically disconnected from the device 100 and may be further removed from the drawer 224. From the disengaged position of FIG. 3, the engaged position of FIG. 2 is achieved by reversing the disengaging steps, namely, lowering the drawer 224 into the recess 208, aligning the drawer 224 with the slot 216 and pushing the drawer 224 into the reader housing 222. To facilitate engagement or disengagement, the slot 216 must be sized to permit passage of the drawer 224, and the recess 208 must have a width 228 that is greater than a length of the drawer 224 to permit lifting or lowering the drawer 224 out of or into the recess 208. Additional particulars of engagement will be further discussed below.

Figure 4:
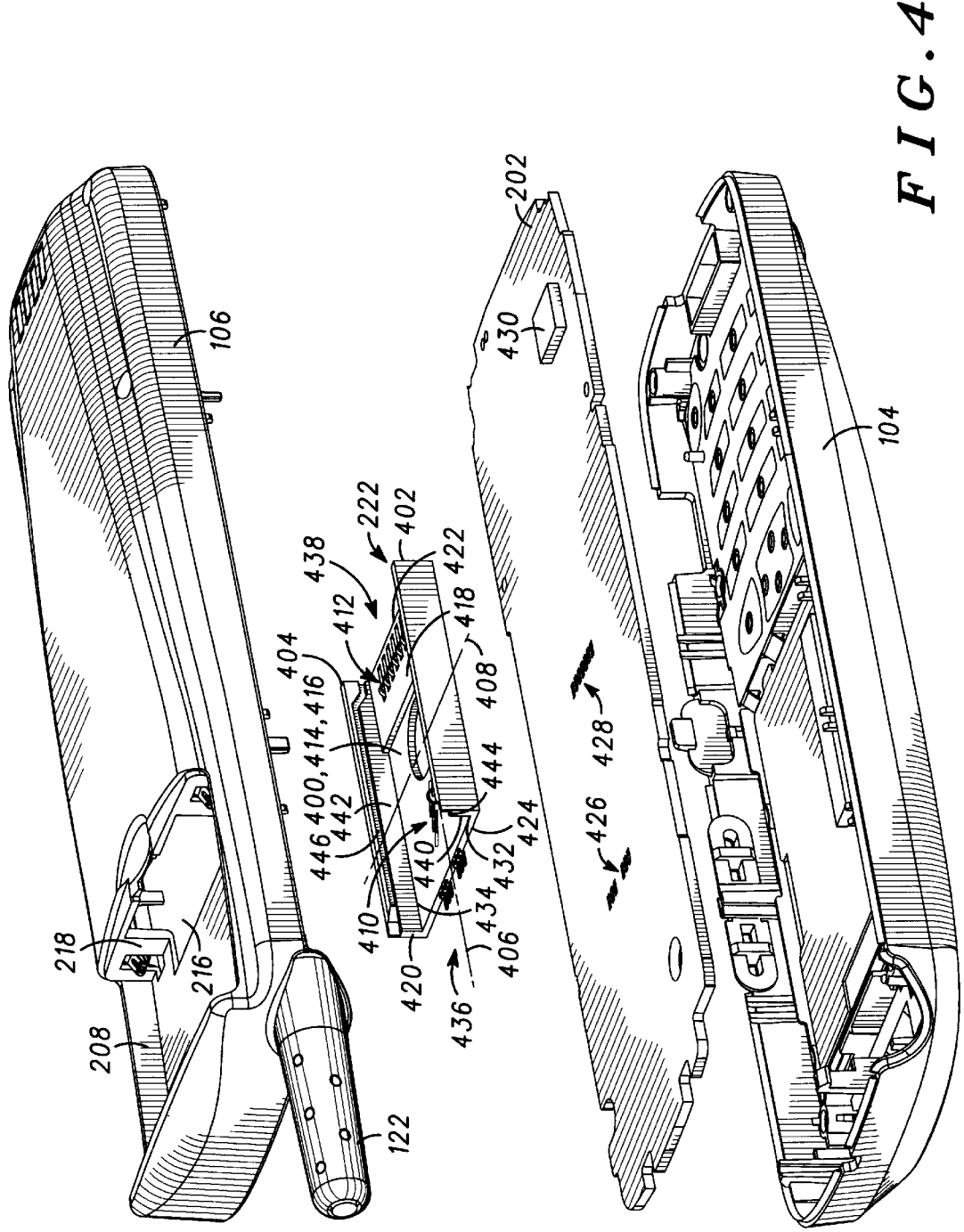
FIG. 4 is an exploded, rear perspective view of the electronic device without the battery pack and showing a rear housing portion, the dual card reader, a circuit board and a front housing portion, and wherein the drawer employed by the dual card reader is not shown for purposes of clarity.
Figure 5:
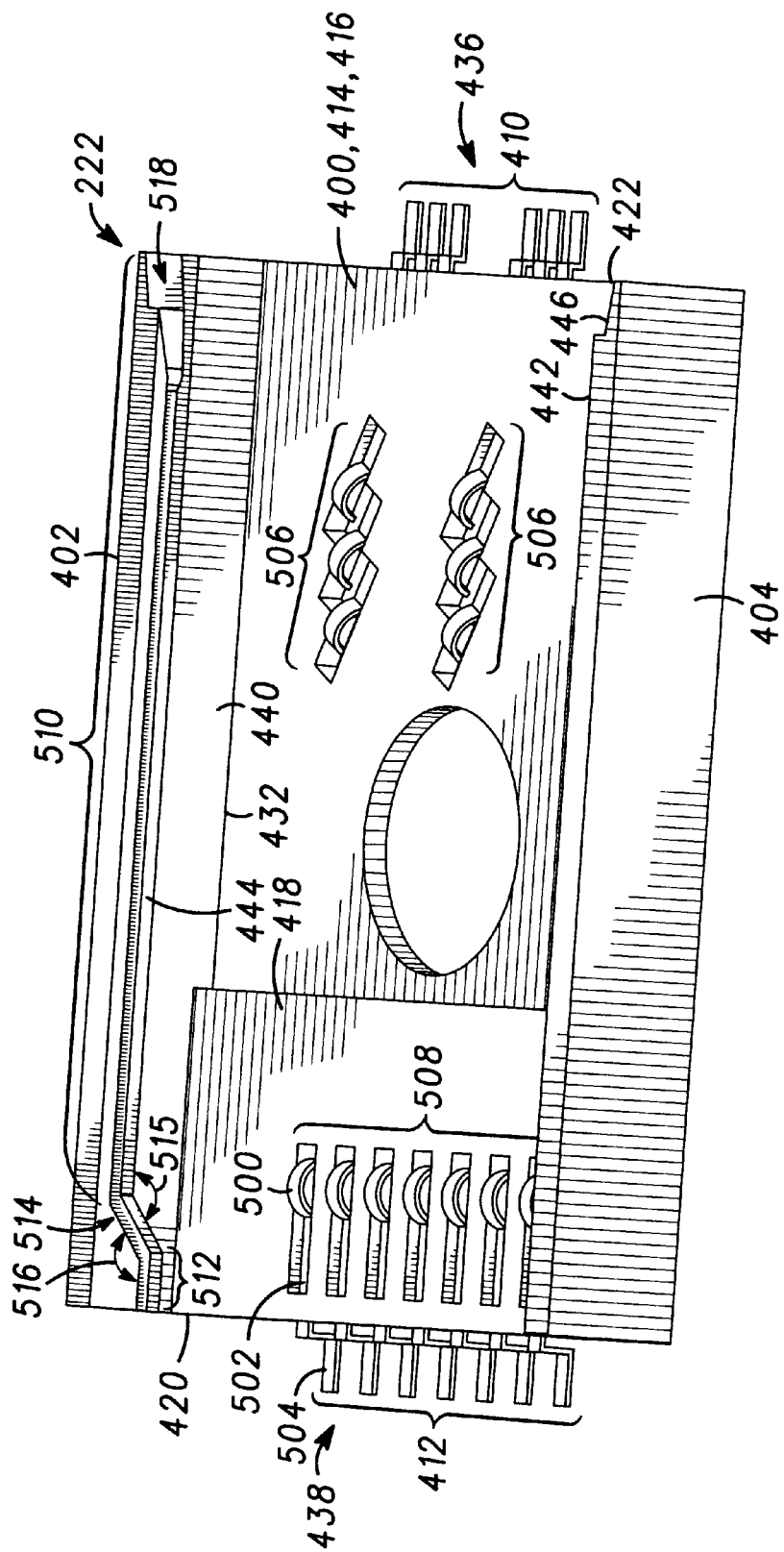
FIG. 5 is a top perspective view of the dual card reader.

The reader housing 222 is molded from thermal plastic resin or other suitable non-conductive material into a low-profile structure defined by a base 400 and sides 402 and 404, as shown in FIGS. 4 and 5. The base 400 is generally rectangular with longitudinal and transverse axes 406 and 408. The base 400 defines the length and width of the reader housing 222, which, in the illustrated embodiment, are approximately 42 mm and approximately 31.1 mm, respectively. Two sets of metallic contacts 410 and 412 are carried on a top surface 414 of the base 400, which is separated into a lower area 416 and an upper area 418 that is non-coplanar with the lower area 416. The set of contacts 410 is arranged according to the set of pads 602 (see FIG. 6) of electronic card 302, while the set of contacts 412 is arranged according to the set of pads 600 (see FIG. 6) of electronic card 300. Each contact of the sets of contacts 410 and 412 is shaped to have an arced tip 500, an arm 502 extending from one end of the tip 500 and a foot 504 extending perpendicularly downward and outward from the arm 502 opposite the tip 500. Two sets of openings 506 and 508 are formed in the top surface 414 of the base 400. In particular, set of openings 506 is formed in the lower area 416 and set of openings 508 is formed in the upper area 418. The tip 500 and a first portion of the arm 502 of each contact of the sets of contacts 410 and 412 are positioned in a corresponding opening of the sets of openings 506 and 508. Each contact of the sets of contacts 410 and 412 is preferably insert molded to the base 400 such that the remaining portion of the arm 502 of each contact of the sets of contacts 410 and 412 passes through a sub-surface layer of the base 400 between the respective sets of openings 506 and 508 and respective opposing ends 420 and 422 of the base 400. Anchoring the arm 502 in this manner creates a deflection point about which the first portion of the arm 502 functions like a spring finger. Each opening of the sets of openings 506 and 508 has a depth sufficient to accommodate deflection of the tip 500 of each contact below the top surface 414. The metallic material forming each contact of the sets of contacts 410 and 412 is sufficiently resilient to return each contact to the position shown in FIG. 5 after deflection. The foot 504 of each contact of the sets of contacts 410 and 412 resides beyond the ends 420 and 422 of the base 400, respectively, and resides substantially co-planar with a bottom surface 424 of the base 400 to allow level seating of the reader housing 222 on the circuit board 202. The foot 504 of each contact of the sets of contacts 410 and 412 is dimensioned to mate with a corresponding pad of two sets of pads 426 and 428, which are carried on the circuit board 202 and electrically connected to a microprocessor 430 via sub-surface traces. The reader housing 222 is secured to the circuit board 202 preferably by a known reflow soldering process that physically and electrically connects the foot 504 of each contact of the set of contacts 410 to a corresponding pad of the set of pads 426, and physically and electrically connects the foot 504 of each contact of the set of contacts 412 to a corresponding pad of the set of pads 428.

The sides 402 and 404 of the reader housing 222 join the base 400 at opposing sides 432 and 434 thereof and extend above the top surface 414 of the base 400. In particular, the sides 402 and 404 extend parallel to the longitudinal axis 406 of the base 400 and perpendicular to the top surface 414 of the base 400. A combination of the thickness of the base 400 and a height of the sides 402 and 404 define a height of the reader housing 222, which, in the illustrated embodiment, is approximately 5.5 mm. The sides 402 and 404 and the base 400 have the same length and, thus, further define uniform, co-planar U-shaped ends 436 and 438 of the reader housing 222. The sides 402 and 404 have inner surfaces 440 and 442, respectively, which carry a portion of the track assembly 304. The track assembly 304 utilizes a track/guide arrangement. In the illustrated embodiment, tracks 444 and 446 are formed in inner surfaces 440 and 442, respectively, and extend in a continuous and unbroken manner along the entire length of the sides 402 and 404, respectively. Each one of the tracks 444 and 446 is defined by two linear segments 510 and 512 and an angled segment 514. The linear segments 510 and 512 extend perpendicularly from the ends 436 and 438 of the reader housing 222, respectively; extend different lengths from the ends 436 and 438 of the reader housing 222, respectively; and are positioned at different heights above the top surface 414 of the base 400 of the reader housing 222. The angled segment 514 joins the linear segments 510 and 512 together. In particular, the linear segment 510 extends along an upper half, and across about eight-ninths of the length, of the sides 402 and 404; the linear segment 512 extends along a lower half, and across about one-eighteenth of the length, of the sides 402 and 404; and the angled segment 514 extends across about one-eighteenth of the length of the sides 402 and 404 forming an angle 516, which is approximately 145 degrees, with each of the linear segments 510 and 512. Each of the tracks 444 and 446 has a substantially constant width and depth except for a mouth and neck 518 formed on the linear segment 510 at the end 436 of the reader housing 222. The mouth portion of the mouth and neck 518 is wide to facilitate initial positioning of the drawer 224 for slidable engagement with the reader housing 222, while the neck portion of the mouth and neck 518 slightly narrows track depth to promote capture of the drawer 224 and prevent undesired disengagement of the drawer 224 from the reader housing 222. The geometry of the tracks 444 and 446, as described, is necessary to prevent undesired wear on, and electrical contact with, the set of contacts 410 during insertion of the drawer 224, as will be further discussed below.

The drawer 224 is molded from thermal plastic resin or other suitable material into a low-profile, rectangular solid structure defined by longitudinal and transverse axes 303 and 305 and having ends 306 and 308 parallel to the transverse axis 305, sides 310 and 312 extending between the ends 306 and 308 and sides 314 and 316 parallel to the longitudinal axis 303 and extending between the ends 306 and 308 and the sides 310 and 312, as shown in FIGS. 3, 6 and 7. The ends 306 and 308 are defined by planar, nondescript surfaces that differ in both height and area from each other. The side 310 is defined by a planar surface having an area greater than an area of each one of the ends 306 and 308 and the sides 314 and 316. A catch 318 is formed in the side 310 along an edge of the drawer 224 where the side 310 meets the end 306. The catch 318, which is sized to accept a tip of a user's finger nail, functions to assist a user in disengagement of the drawer 224 from the reader housing 222.

The side 312, which is opposite to side 310, has wells 606 and 608 formed therein to receive electronic cards 300 and 302, respectively. A periphery 610 circumscribing the wells 606 and 608 defines a top surface of the side 312. The periphery 610 has a recessed periphery area 611 for mating with the end 308 of the drawer 224, which has height that is smaller than the end 306 of the drawer 224. The recessed periphery area 611 extends from the end 308 for approximately one-fourth of the length of the drawer 224. The well 606 is bounded by a planar base surface 612; longitudinally extending side walls 614 and 616 positioned across the periphery 610 from the sides 314 and 316, respectively; and end walls 618 and 620 positioned across the periphery 610 from the ends 306 and 308, respectively. A depth of the well 606 is generally defined by the vertical distance between the base surface 612 and the horizontal planes on which the periphery 610 and the recessed periphery area 611 reside. The depth of the well 606 adjacent to the periphery 610 is approximately equal to a sum of the thicknesses of the first and second electronic cards 300 and 302, while the depth of the well 606 adjacent to the recessed periphery area 611 is approximately equal to the thickness of the first electronic card 300. The distance between the side walls 614 and 616 defines a width of the well 606, while the distance between the end walls 618 and 620 defines a length of the well 606. In the illustrated embodiment, the length, width and depth of the well 606, which define its volume, are approximately 32.1 mm, approximately 24.1 mm and approximately 2.25 mm, respectively, and are sufficient to accommodate the 32 mm length, the 24 mm width and the 1.4 mm thickness of the electronic card 300. The well 606 is keyed at the side wall 614—end wall 620 junction to correspond to a keyed edge of the electronic card 300 and, thereby, assist the user to properly insert the electronic card 300 into the well 606. A spring finger assembly 621 is formed in a recess in the end wall 618 to promote secure receipt of the electronic card 300 in the well 606. The spring finger assembly 621 has a height that does not exceed the height of the side wall 628 and, in an undeflected position, effectively reduces the length of the well 606 to less than the length of the electronic card 300.

To minimize the dimensions of the dual card reader 214, the drawer 224 is designed so that at least a portion of the well 608 overlies at least a portion of the well 606 thereby facilitating stacking of the electronic cards 300 and 302. In particular, the well 608 is formed to overlap, or coextend with, just less than one-half of the well 606 proximate to the end 306 of the drawer 224. This overlapping forms a ledge 622 that is positioned below, and inside of, a segment of the periphery 610 and around the end wall 618 and portions of the side walls 614 and 616 of the well 606. Joining the ledge 622 to the periphery 610 are opposing transversely extending end walls 624 and 626, which are positioned across the periphery 610 from the sides 314 and 316, respectively; a side wall 628, which is positioned across the periphery 610 from the end 306 and joins the end walls 624 and 626; and corner walls 630 and 632 which join the end walls 624 and 626, respectively, opposite the side wall 628. The end walls 624 and 626 of the well 608 are spaced further apart than the side walls 614 and 616 of the well 606. A depth of the well 608 is generally defined by the vertical distance between the horizontal plane on which the ledge 622 resides and the horizontal plane on which the periphery 610 resides. The distance between the end walls 624 and 626 defines a length of the well 608, while the distance between the side wall 628 and the corner walls 630 and 632 defines a width of the well 608. In the illustrated embodiment, the length, width and depth of the well 608, which define its volume, are approximately 25.1 mm, approximately 15.1 mm and approximately 0.85 mm, respectively, and are sufficient to accommodate the 25 mm length, the 15 mm width and the 0.8 mm thickness of the electronic card 302. The well 608 is keyed at the end wall 626—side wall 628 junction to correspond to a keyed edge of the electronic card 302 and, thereby, assist the user to properly insert the electronic card 302 into the well 608. A spring finger assembly 634 is formed in a recess in the side wall 628 to promote secure receipt of the electronic card 302 in the well 608. The spring finger assembly 634 has a height that does not exceed the height of the side wall 628 and, in an undeflected position, effectively reduces the width of the well 608 to less than the width of the electronic card 302.

Insertion of one or both of the electronic cards 300 and 302 into the wells 606 and 608, respectively, is described in the following manner with reference primarily to FIGS. 6 and 7. The electronic card 300 is inserted into the well 606 by aligning the electronic card 300 above the well 606 (as shown in FIG. 6) such that the set of pads 600 of the electronic card 300 faces away from the well 606. The electronic card 300 is slightly tilted as it is lowered into the well 606 to engage and deflect the spring finger assembly 621 using an end 638 of the electronic card 300. Once the spring finger assembly 621 is deflected, the electronic card 300 is leveled to rest on the base surface 612 of the well 606. The deflected spring finger assembly 621 reduces the effective length of the well 606 to that of the length of the electronic card 300 and, in doing so, urges the electronic card 300 into abutment with the end wall 620 of the well 606 to secure the electronic card 300 in the well 606. Once the electronic card 300 is inserted, the housing 302 is flush with the recessed periphery area 611, as shown in FIG. 7. During insertion, the electronic card 300 passes through the well 608. As such, if a user wishes to insert both electronic cards 300 and 302 into the drawer 224, the electronic card 300 must be inserted first.

The electronic card 302 is inserted into the well 608 by aligning the electronic card 302 above the well 608 (as shown in FIG. 6) such that the set of pads 602 of the electronic card 302 faces away from the well 608. The electronic card 300 is slightly tilted as it is lowered into the well 608 to engage and deflect the spring finger assembly 634 using a side 640 of the electronic card 302. Once the spring finger assembly 634 is deflected, the electronic card 302 is leveled to rest on the ledge 622. In the event that the electronic card 302 is inserted into the drawer 224 following insertion of the electronic card 300, the electronic card 302 will also rest on a portion of the electronic card 300. The deflected spring finger assembly 634 reduces the effective width of the well 606 to that of the width of the electronic card 302 and, in doing so, urges the electronic card 302 into abutment with the corner walls 632 and 630 to secure the electronic card in the well 608. Once inserted, the electronic card 302 is flush with the periphery 610, as shown in FIG. 7.

Removal of one or both of the electronic cards 300 and 302 is accomplished by substantially reversing the insertion steps described above and, for purposes of brevity, will not be fully discussed here. In the event that both of the electronic cards 300 and 302 are received in the drawer 224 and are to be removed, the electronic card 300 is removed first and the electronic card 302 is removed second.

The sides 314 and 316 of the drawer 224 are defined by a planar surface having an area greater than an area of each one of the ends 306 and 308. The sides 314 and 316 are stepped to accord with the recessed periphery area 611 and the end 308 of the drawer 224. The sides 314 and 316 carry a portion of the track assembly 304, which utilizes a track/guide arrangement. In the illustrated embodiment, each of the sides 314 and 316 carry guides 320 and 700, respectively. The guides 320 and 700 are adapted to be slidably received in tracks 444 and 446, respectively. In particular, each of the guides 320 and 700 has generally cylindrical prongs 322 and 324. Each of the prongs 322 and 324 has a diameter less than a width of the tracks 444 and 446 and a height less than a depth of tracks 444 and 446. The prong 322 is positioned on the upper half of each of the sides 314 and 316 in close proximity to edges where each of the sides 314 and 316 meets the recessed periphery area 611 of the side 312 and where each of the sides 314 and 316 meets the end 308. The prong 324 is positioned on the lower half of each of the sides 314 and 316 in close proximity to the edge where each of the sides 314 and 316 meets the side 310

Insertion of the drawer 224 into the reader housing 222 is described in the following manner with reference primarily to FIGS. 2–7. The drawer 224, positioned with the side 312 facing the recess 208, is vertically lowered into the recess 208 with the end 308 facing the slot 216. During movement of the drawer 224, a force exerted by the spring finger assemblies 621 and 634 is sufficient to hold, and prevent unintentional dislodgment of, any of the electronic cards 300 and 302 received in the drawer 224. The drawer 224 is moved into the slot 216 to feed the prong 322 of each of the guides 320 and 700 into the mouth and neck 518 of each of the tracks 444 and 446, respectively. The drawer 224 is slid in the reader housing 222 until the prong 322 of each of the guides 320 and 700 has traversed the linear segment 510 of each of the tracks 444 and 446, respectively. The location on the drawer 224 of the prong 322 of each of the guides 320 and 700 and the location on the sides 402 and 404 of the linear segment 510 of each of the tracks 444 and 446 ensure that no part of the side 312 of the drawer 224, including any of the electronic cards 300 and 302 positioned in the drawer 224, contacts the set of contacts 410 of the reader housing 222 during this traversal of the linear segment 510. This prevents one or both of the electronic cards 300 and 302 from excessively wearing the set of contacts 410 and from making intermittent electrical contact with the set of contacts 410, during insertion of the drawer 224. Also, to facilitate this raised positioning during insertion of the drawer 224, a width 326 of the slot 216 must be sized larger than the height of the reader housing 222. Following traversal of the linear segment 510, the prong 324 of each of the guides 320 and 700 enters the mouth and neck 518 of the linear segment 510 of each of the tracks 444 and 446, respectively, and the prong 322 of each of the guides 320 and 700 traverses the angled segment 514 of each of the tracks 444 and 446 so as to move the side 312 of the drawer 224 closer to the top surface 414 of the base 400 of the reader housing 222. Upon completion of traversal of the angled segment 514, the prong 322 of each of the guides 320 and 700 enters the linear segment 512 of each of the tracks 444 and 446, respectively. To complete insertion and engage the drawer 224 and the reader housing 222, the drawer is slid horizontally until the prong 322 of each of the guides 320 and 700 rests in the linear segment 512 of each of the tracks 444 and 446, respectively, at the end 438 of the reader housing 222 and the prong 324 of each of the guides 320 and 700 passes the mouth and neck 518 of each of the tracks 444 and 446, respectively. In the fully inserted or engaged position, the periphery 610 of the drawer 224 juxtaposes the lower area 416 of the top surface 414 of the base 400 of the drawer 224 and the well 608 is aligned with the set of contacts 410; the recessed periphery area 611 juxtaposes the raised area 418 of the top surface 414 of the base 400 of the drawer 224 and the well 606 is aligned with the set of contacts 412; the side 314 of the drawer 224 juxtaposes the inner surface 440 of the side 402 of the reader housing 222; the side 316 of the drawer 224 juxtaposes the inner surface 442 of the side 404 of the reader housing 222; and the longitudinal axis 303 of the drawer 224 overlies the longitudinal axis 406 of the reader housing 222; and the transverse axis 305 of the drawer 224 overlies the transverse axis 408 of the reader housing 222.

Figure 8:
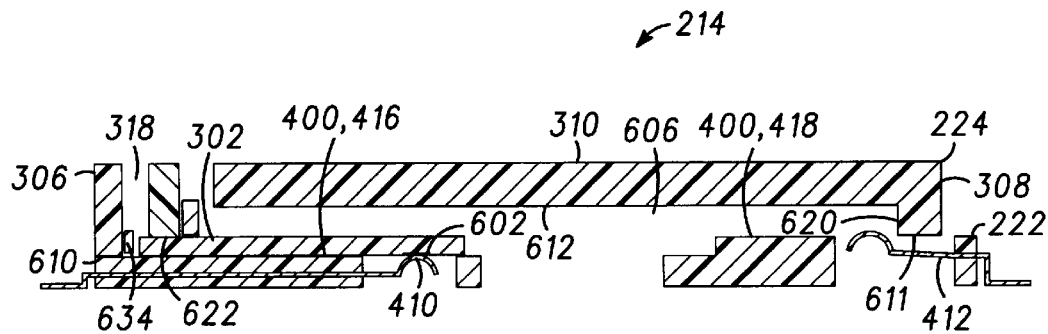
FIG. 8 is a partial cross sectional view of the electronic device taken across section lines 8—8 in FIG. 2 showing the dual card reader with the drawer received therein and with one of the electronic cards received in the drawer.
Figure 9:
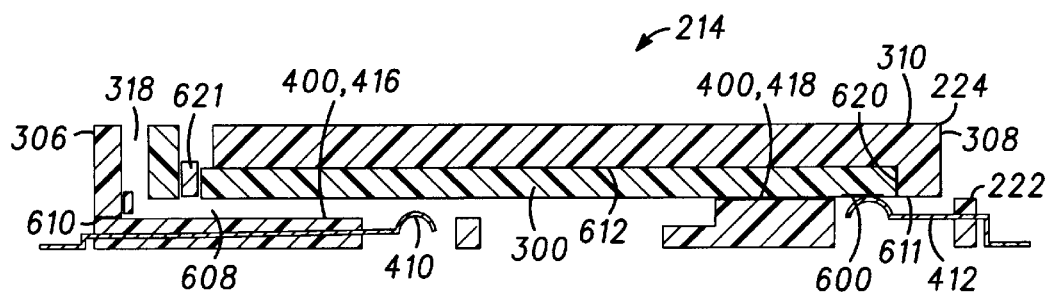
FIG. 9 is the partial cross sectional view of FIG. 8 showing the dual card reader with the drawer received therein and with the other one of the electronic cards received in the drawer.
Figure 10:
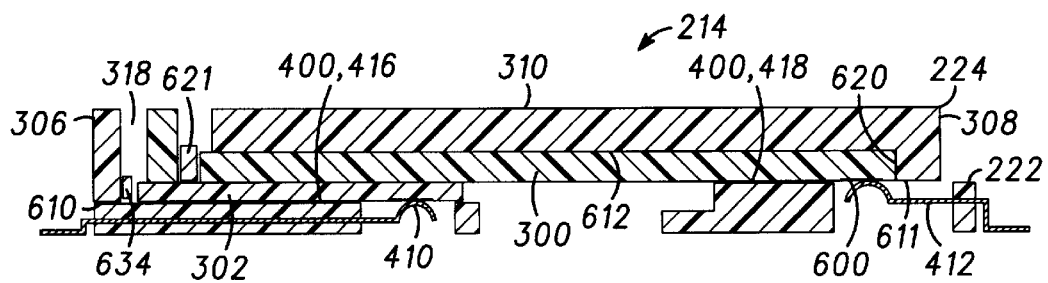
FIG. 10 is the partial cross sectional view of FIG. 8 showing the dual card reader with the drawer received therein and both electronic cards received in the drawer.

FIGS. 8–10 illustrate cross sectional views of the dual card reader 214 when only the electronic card 302 is received in the drawer 224 and the drawer 224 and the reader housing 222 are engaged (FIG. 8); when only the electronic card 300 is received in the drawer 224 and the drawer 224 and the reader housing 222 are engaged (FIG. 9); and when both the electronic cards 300 and 302 are received in the drawer 224 and the drawer 224 and the reader housing 222 are engaged (FIG. 10). For purposes of clarity, the structure of the drawer 224 and the reader housing 222 residing behind the cross sectional views has been removed. When the electronic card 302 is received in the drawer 224, with or without the electronic card 300, the set of pads 602 physically and electrically connects to corresponding ones of the set of contacts 410, as exemplified in FIGS. 8 and 10 by the deflection of the contact of the set of contacts 410. When the electronic card 300 is received in the drawer 224, with or without the electronic card 302, the set of pads 600 physically and electrically connects to corresponding ones of the set of contacts 412, as exemplified in FIGS. 9 and 10 by the deflection of the contact of the set of contacts 412. The connection between the sets of pads 600 and 602 and the sets of contacts 410 and 412 enables the microprocessor 430 to access or read electronic information stored in the electronic cards 300 and 302.

Figure 11:
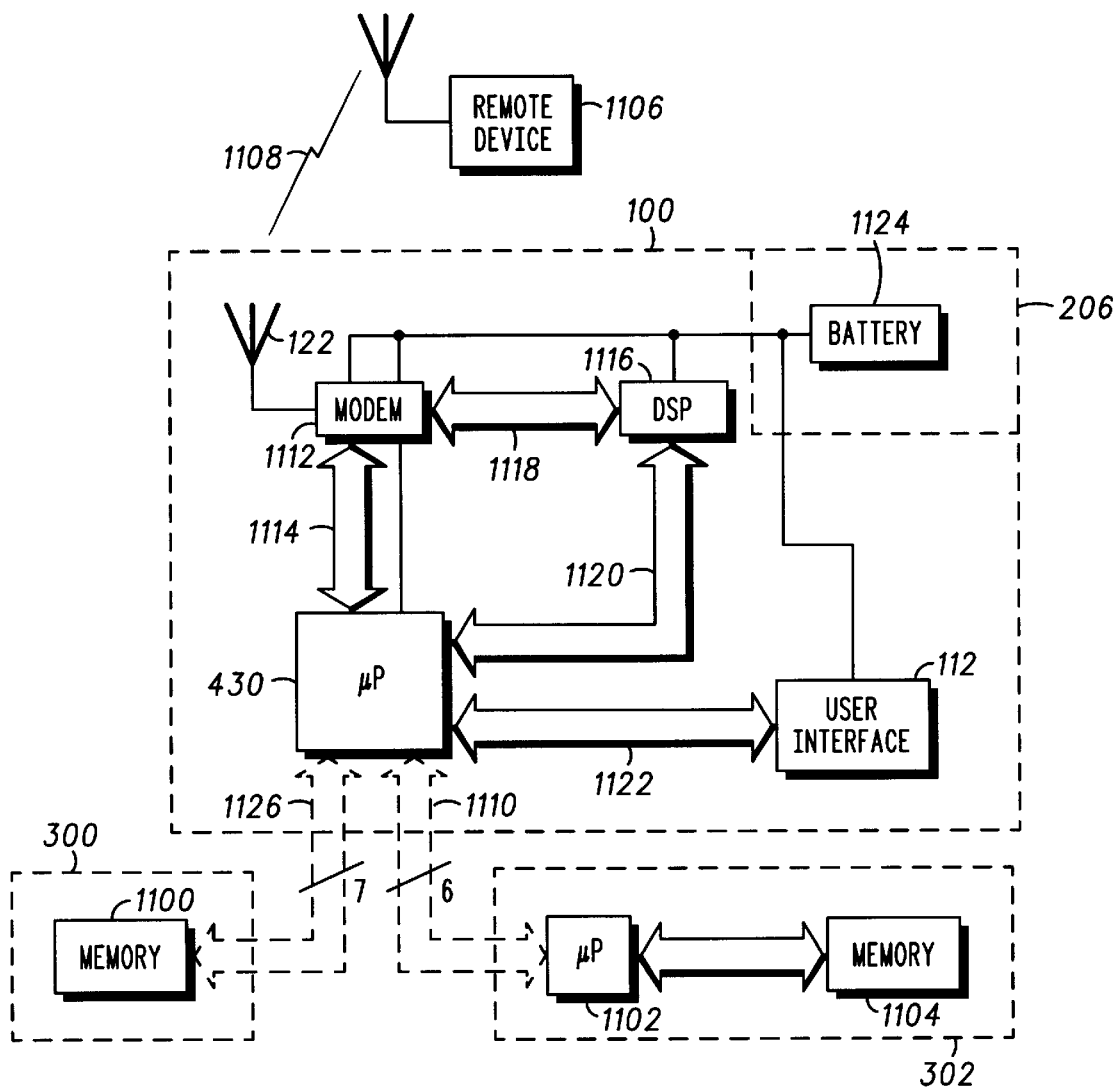
FIG. 11 is an electrical block diagram of the electronic device.

The electrical connection of one or both of the electronic cards 300 and 302 to the electronic device 100 is shown in FIG. 11. As a cellular telephone, the electronic device 100 utilizes the electronic card 302 to facilitate communication with a remote device 1106 via a wireless communication link 1108. In particular, the microprocessor 430 of the device 100 communicates with the microprocessor 1102 of the electronic card 302 via a bus 1110 to determine subscriber account identification information stored in the memory 1104 of the electronic card 302. The bus 1110 employs six lines, each physically defined by a different contact of the set of contacts 410 (see FIG. 4) and the set of pads 600 (see FIG. 6). Using the subscriber account identification information, the microprocessor 430 configures and controls the device 100 to transmit and receive communication signals, preferably radio frequency signals, via the link 1108. The device 100 includes a MODEM (modulator/demodulator) 1112 to modulate signals to be transmitted via the antenna 122 and to demodulate signals received by the antenna 122, a DSP (digital signal processor) 1116 to perform processing functions on signals including but not limited to demodulated signals and signals to be modulated, and a user interface 112 to input and output voice and data from and to a user. The microprocessor 430 controls, and also receives information from, the MODEM 1112 via a bus 1114, the DSP 1116 via a bus 1120 and the user interface 112 via a bus 1122. The MODEM 1112 and the DSP 1116 communicate via a bus 1118. A battery 1124 disposed in the battery pack 206 provides power for use by the microprocessor 430, the MODEM 1112, the DSP 1116 and the user interface 112. The microprocessor 430 of the device 100 communicates with the memory 1100 of the electronic card 300 via a bus 1126 to retrieve information stored in the memory 1100 or store information to the memory 1100. The bus 1126 employs seven lines, each physically defined by a different contact of the set of contacts 412 (see FIG. 4) and the set of pads 600 (see FIG. 6). Information retrieved from the memory 1100 may be coupled directly to the user interface 112 by the microprocessor 430 via the bus 1122 for output to the user. Other information retrieved from the memory 1100 may be utilized directly by the microprocessor 430 to expand the functionality of the device 100. Information received from the remote device 1106 via the communication link 1108 may be stored by the microprocessor 430 in the memory 1100 for later retrieval. While the benefits of having both of the electronic cards 300 and 302 electrically connected to the microprocessor 430 at the same time are apparent, the device 100 may still operate with limited functionality and capability if only one of the electronic cards 300 and 302 is electrically connected. For example, with only the electronic card 302 connected, the device 100 still has full cellular telephone functionality. With only the electronic card 300 connected, the functionality of the device 100 may be defined solely by the information stored in the memory 1100 in the form of, for example, a personal organizer application, a voice recorder application or a word processing application.

Removal of the drawer 224 from the reader housing 222 to, for example, replace one or both of the electronic cards 300 and 302, is accomplished by substantially reversing the insertion steps described above with reference to FIGS. 2–7 and, for purposes of brevity, will not be fully discussed here.

Figure 12:
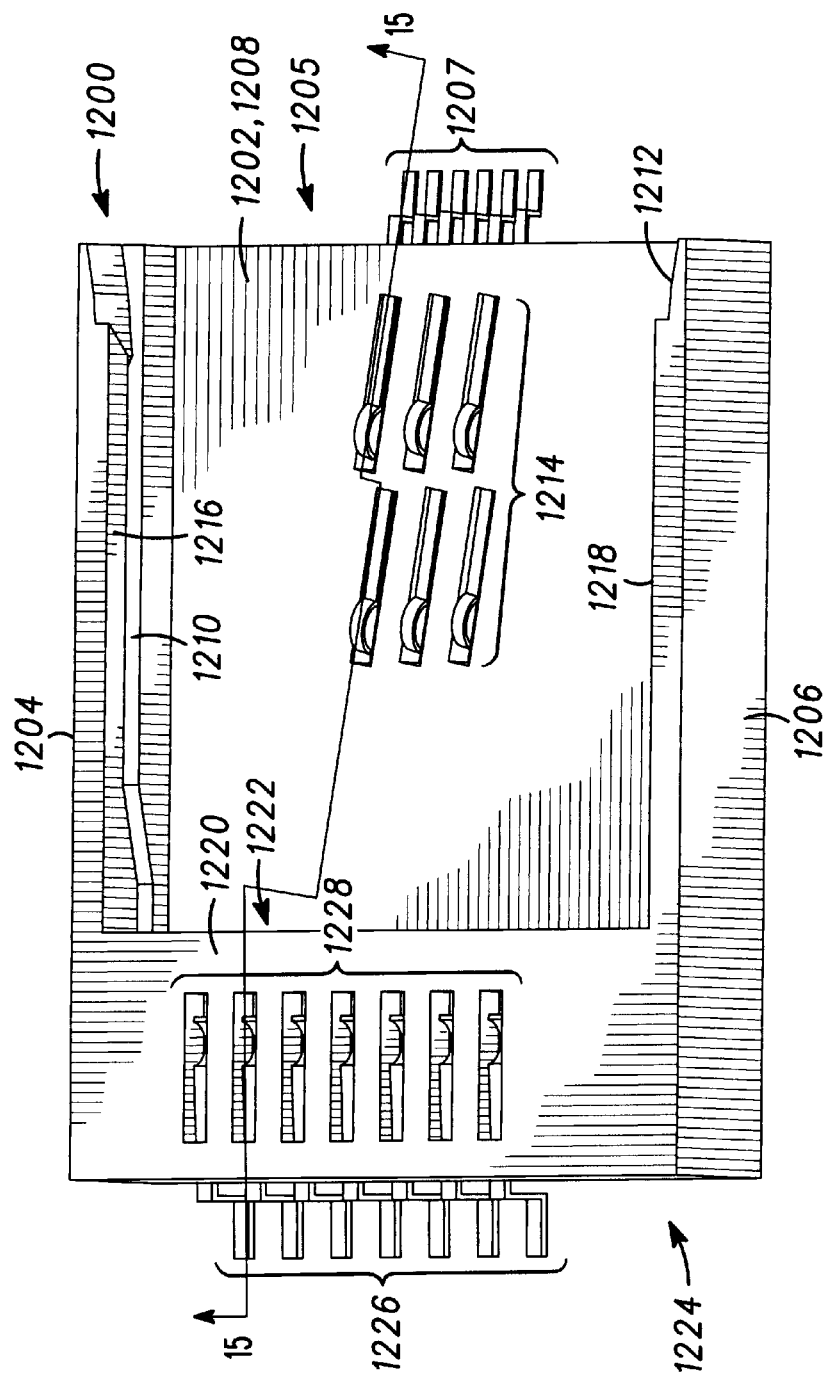
FIG. 12 is a top perspective view of an alternate dual card reader.

An alternate dual card reader, which may be installed in the device 100 (see FIG. 2) behind the slot 216 instead of the dual card reader 214 and is consistent with the operation of the device 100 described in FIG. 11, is shown in FIGS. 12–17 to have a reader housing 1200 and an alternate drawer 1300. The alternate reader housing 1200, like the reader housing 222 of the dual card reader 214 (see FIG. 5), is molded from thermal plastic resin or other suitable nonconductive material into a low-profile structure defined by a base 1202 and longitudinally extending, raised sides 1204 and 1206 as shown in FIG. 12. A top surface 1208 of the base 1202 at one end 1205 of the alternate reader housing 1200 carries a set of contacts 1207 arranged according to the set of pads 602 (see FIG. 6) of the electronic card 302. A first portion of each contact of the set of contacts 1207 is positioned in a corresponding opening of a set of openings 1214 formed in the top surface 1204, while the remaining portion of each contact of the set of contacts 1207 passes through a sub-surface layer of the base 1202 and out of the base 1202 to facilitate circuit board connection. The sides 1204 and 1206 carry tracks 1210 and 1212, similar to tracks 444 and 446 of the reader housing 222, on inner surfaces 1216 and 1218, respectively. The tracks 1210 and 1212, which are defined by two linear segments positioned around an angled segment, extend in a continuous and unbroken manner along approximately the entire length of the sides 1204 and 1206.

Unlike the reader housing 222, the alternate reader housing 1200 employs a surface 1220 extending between the sides 1204 and 1206 and spaced from the top surface 1204 of the base 1202 to form a pocket 1222 located at the other end 1224 of the alternate reader housing 1200. The surface 1220 carries a set of contacts 1226 arranged according to the set of pads 600 (see FIG. 6) of the electronic card 300 and facing the pocket 1222. A first portion of each contact of the set of contacts 1226 is positioned in a corresponding opening of a set of openings 1228 extending through the surface 1220, while the remaining portion of each contact of the set of contacts 1226 passes through a sub-surface layer of the surface 1220 and out of the base 1202 to facilitate circuit board connection.

Figure 13:
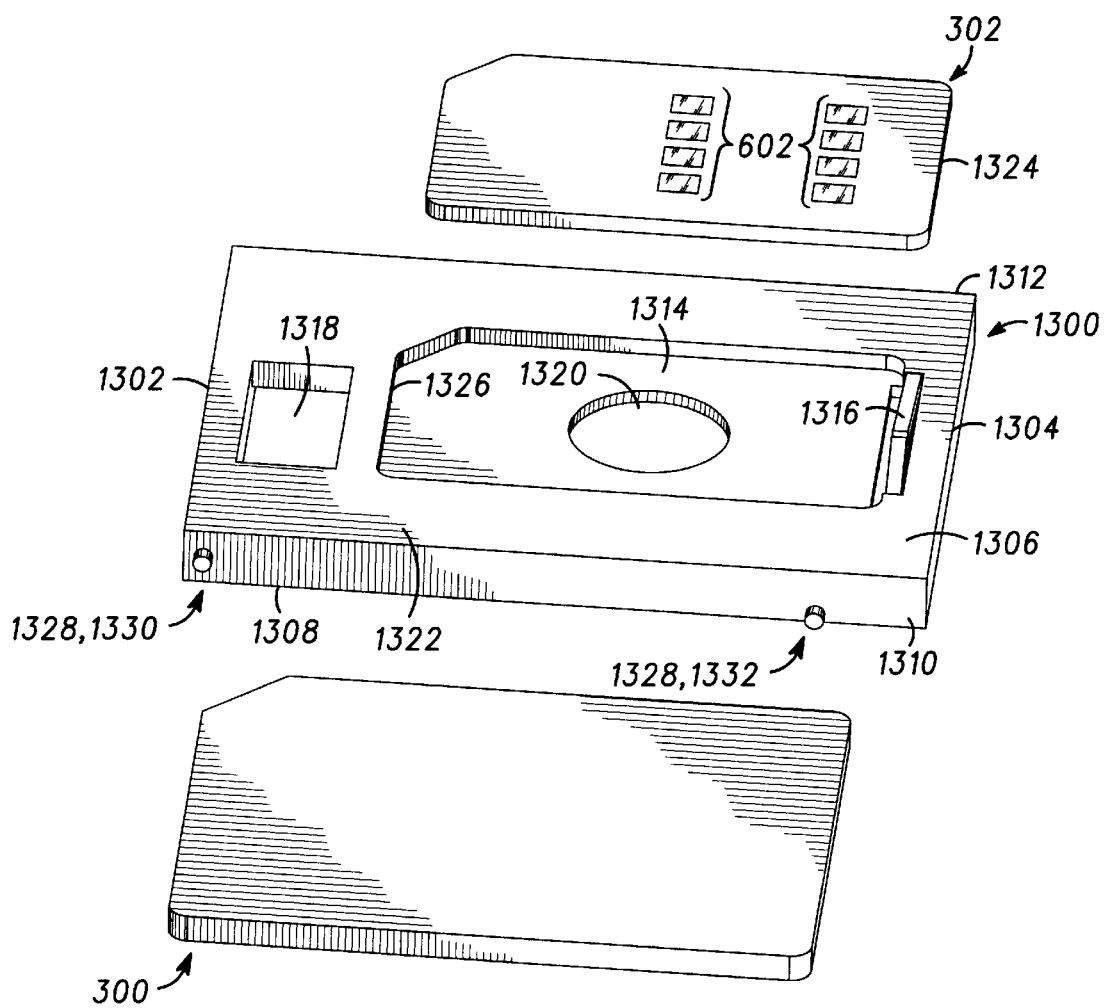
FIG. 13 is a bottom perspective view of an alternate drawer and the electronic cards removed from the alternate drawer.
Figure 14:
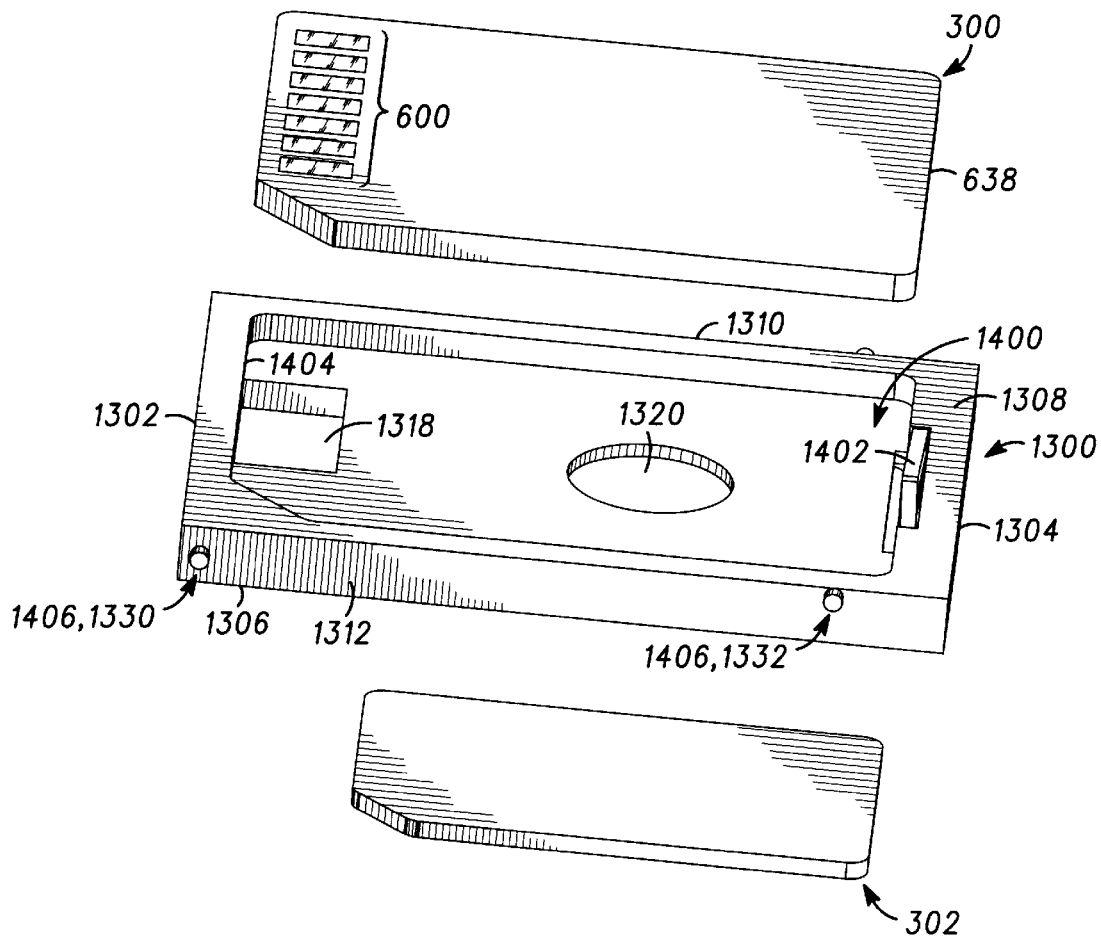
FIG. 14 is a bottom perspective view of the alternate drawer and the electronic cards removed from the alternate drawer.

The alternate drawer 1300, like the drawer 224 of the dual card reader 214 (see FIG. 5), is molded from thermal plastic resin or other suitable material into a low-profile, rectangular solid structure having ends 1302 and 1304 and sides 1306, 1308, 1310 and 1312 extending between, and perpendicular to, the ends 1302 and 1304, as shown in FIGS. 13 and 14. The sides 1306 and 1308 are each defined by a planar surface having an area greater than an area of each one of the ends 1302 and 1304 and 308 and each one of the sides 1310 and 1312. Like the drawer 224, the alternate drawer 1300 has wells 1314 and 1400 that are sized to receive the electronic cards 302 and 300, respectively, and keyed to ensure correct insertion of the electronic cards 302 and 300; spring finger assemblies 1316 and 1402 to removably secure the electronic cards 302 and 300 in the wells 1314 and 1400, respectively; and at least a portion of one of the wells overlying at least a portion of the other one of the wells to facilitate stacking of the electronic cards 300 and 302.

However, unlike the drawer 224, the wells 1314 and 1400 are formed on opposite sides of the alternate drawer 1300, namely on the sides 1306 and 1308, respectively. To accommodate this arrangement, a thickness of the alternate drawer 1300, as defined by the height of the sides 1310 and 1312, must be greater than a sum of the thicknesses of the electronic cards 300 and 302. Finger openings 1318 and 1320 sized to permit passage of at least a portion of a user's finger tip are employed by the alternate drawer 1300 to facilitate ejection of the electronic cards 300 and 302, respectively. The finger opening 1318 extends through the alternate drawer 1300 and is positioned at an area outside of the well 1314 on the side 1306 and at an area in the well 1400 on the side 1308. The finger opening 1320 extends through the alternate drawer 1300 and is positioned at an area inside the well 1314 on the side 1306 and at an area inside the well 1400 on the side 1308.

Insertion of one or both of the electronic cards 300 and 302 into the wells 1400 and 1314, respectively, is described in the following manner with reference primarily to FIGS. 13 and 14. The electronic card 300 is inserted into the well 1400 by aligning the electronic card 300 above the well 1400 (as shown in FIG. 14) such that the set of pads 600 faces away from the well 606. The electronic card 300 is slightly tilted as it is lowered into the well 1400 to engage and deflect the spring finger assembly 1402 using the end 638 of the electronic card 300. Once the spring finger assembly 1402 is deflected, the electronic card 300 is leveled to rest in the well 606 such that the electronic card 300 is flush and continuous with the area of the side 1308 outside of the well 1400. The spring finger assembly 1402 forces the electronic card 300 into abutment with an end wall 1404 of the well 1400 thereby securing the electronic card 300. The electronic card 302 is inserted into the well 1314 by aligning the electronic card 302 above the well 1314 (as shown in FIG. 13) such that the set of pads 602 faces away from the well 1314. The electronic card 302 is slightly tilted as it is lowered into the well 608 to engage and deflect the spring finger assembly 1316 using an end 1324 of the electronic card 302. Once the spring finger assembly 1316 is deflected, the electronic card 300 is leveled to rest in the well 1314 such that the electronic card 302 is flush and continuous with the area of the side 1306 outside of the well 1314. The spring finger assembly 1316 forces the electronic card 302 into abutment with an end wall 1326 of the well 1314 thereby securing the electronic card 302. Unlike, the drawer 224, the alternate drawer 1300 does not require an insertion priority and either one of the electronic cards 300 and 302 may be inserted before the other.

Removal of one or both of the electronic cards 300 and 302 from the alternate drawer 1300 is accomplished by substantially reversing the insertion steps described above and, for purposes of brevity, will not be fully discussed here. However, in the event that both of the electronic cards 300 and 302 are received in the alternate drawer 1300 and are to be removed, the electronic card 300 must be removed first to permit access to the finger opening 1320 used to eject the electronic card 302. The electronic card 300 is removed by extending a finger tip into the finger opening 1318 via the side 1306 and pressing the electronic card 300 until it ejects from the well 1400. Once the electronic card 300 is ejected, the electronic card 302 can be removed by extending a finger tip into the finger opening 1320 via the side 1308 and pressing the electronic card 302 until it ejects from the well 1314.

The sides 1310 and 1312 of the alternate drawer 1300 carry guides 1328 and 1406, similar to the guides 320 and 700 of the drawer 224. Prongs 1330 and 1332 of each of the guides 1328 and 1406 are adapted to be slidably received in tracks 1210 and 1212, respectively. However, unlike the drawer 224, the prong 1330 is positioned along a longitudinal mid-line of the sides 1310 and 1312 and 316 in close proximity to the end 1302, and the prong 1332 is positioned in proximity to the end 1304 and at the edge where each of the sides 1310 and 1312 meets the side 1308.

Insertion of the alternate drawer 1300 into the alternate reader housing 1200 is described in the following manner with reference primarily to FIGS. 12–14. The alternate drawer 1300 is horizontally aligned so that the side 1306 faces downward and the end 1302 faces the end 1205 of the alternate reader housing 1200. The alternate drawer 1300 is moved horizontally to feed the prong 1330 of each of the guides 1328 and 1406 into each of the tracks 1210 and 1212, respectively. The alternate drawer 1300 is slid horizontally in the alternate reader housing 1200 until the prong 1330 of each of the guides 1328 and 1406 has traversed the first linear segment of each of the tracks 1210 and 1212, respectively. The location on the alternate drawer 1300 of the prong 1330 and the location on the sides 1310 and 1312 of the first linear segment of each of the tracks 1210 and 1212 ensure that no part of the side 1306 of the alternate drawer 1300, including the electronic card 302 positioned in the alternate drawer 1300, contacts the set of contacts 410 of the alternate reader housing 1200 during this traversal of the first linear segment. This prevents the electronic card 302 from excessively wearing the set of contacts 410 and from making incomplete electrical contact with the set of contacts 410, the alternate drawer 1300. Following traversal of the first linear segment, the prong 1332 of each of the guides 1328 and 1406 enters the first linear segment of each of the tracks 1210 and 1212. The prong 1330 of each of the guides 1328 and 1406 traverses the angled segment of each of the tracks 1210 and 1212 moving the side 1306 of the alternate drawer 1300 closer to the top surface 1204 of the base 1202 of the alternate reader housing 1200. Upon traversal of the angled segment, the end 1302 of the alternate drawer 1300 enters the pocket 1222, and the prong 1330 of each of the guides 1328 and 1406 enters the second linear segment of each of the tracks 1210 and 1212, respectively. To complete insertion and engage the alternate drawer 1300 and the alternate reader housing 1200, the drawer is slid until the prong 1330 of each of the guides 1328 and 1406 rests in the second linear segment of each of the tracks 1210 and 1212, respectively, closely proximate to the end 1224 of the alternate reader housing 222; the prong 1332 of each of the guides 1328 and 1406 is captured in the first linear segment; and the end 1304 of the alternate drawer 1300 is flush with the end 1205 of the alternate reader housing 222. In the fully inserted or engaged position, about one-fourth of the alternate drawer 1300 is received in the pocket 1222 of the alternate reader housing 1200 and about one-fourth of the well 1400 underlies, and is aligned with, the set of contacts 1226; and the well 1314 is aligned with the set of contacts 1207.

Figure 15:
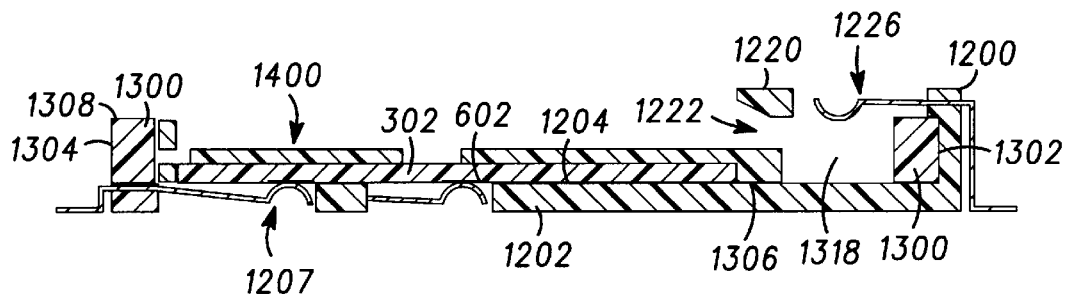
FIG. 15 is a cross sectional view of the alternate dual card reader taken across section lines 15—15 in FIG. 12 when the alternate drawer is received in the alternate dual card reader and one of the electronic cards is received in the alternate drawer.
Figure 16:
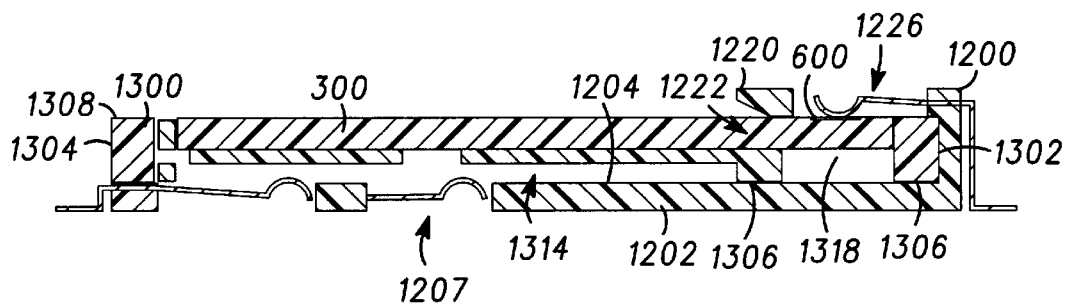
FIG. 16 is the cross sectional view of FIG. 15 when the alternate drawer is received in the alternate dual card reader and the other one of the electronic cards is received in the alternate drawer.
Figure 17:
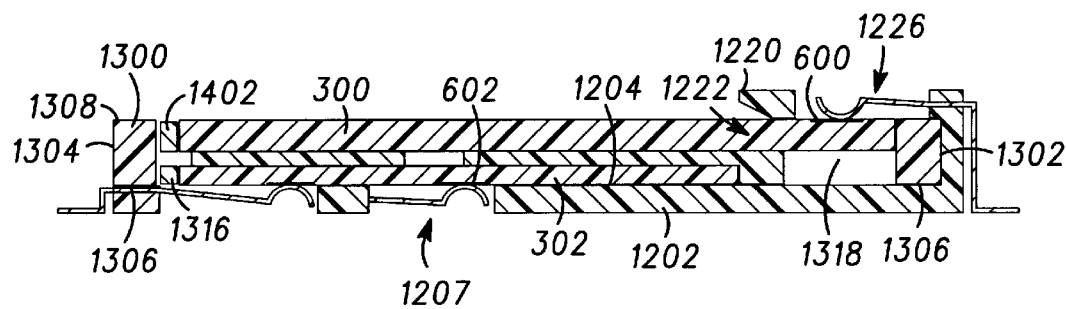
FIG. 17 is the cross sectional view of FIG. 15 when the alternate drawer is received in the alternate dual card reader and both of the electronic cards are received in the alternate drawer.

FIGS. 15–17 illustrate cross sectional views of the alternate dual card reader when only the electronic card 302 is received in the alternate drawer 1300 and the alternate drawer 1300 and the alternate reader housing 1200 are engaged (FIG. 15); when only the electronic card 300 is received in the alternate drawer 1300 and the alternate drawer 1300 and the alternate reader housing 1200 are engaged (FIG. 16); and when both the electronic cards 300 and 302 are received in the alternate drawer 1300 and the alternate drawer 1300 and the alternate reader housing 1200 are engaged (FIG. 17). For purposes of clarity, the structure of the alternate drawer 1300 and the alternate reader housing 1200 residing behind the cross sectional views has been removed. When the electronic card 302 is received in the alternate drawer 224, with or without the electronic card 300, the set of pads 602 physically and electrically connects to corresponding ones of the set of contacts 1207, as exemplified in FIGS. 15 and 17 by the deflection of the contacts of the set of contacts 1207. When the electronic card 300 is received in the alternate drawer 224, with or without the electronic card 302, the set of pads 600 physically and electrically connects to corresponding ones of the set of contacts 1226, as exemplified in FIGS. 16 and 17 by the deflection of the contact of the set of contacts 1226. The connection between the sets of pads 600 and 602 and the sets of contacts 1226 and 1207 enables the microprocessor 430 to access or read electronic information stored in the electronic cards 300 and 302.

One skilled in the art will recognize that the overlapping arrangement of the wells 606 and 608 of the drawer 224 of the dual card reader 214 of FIGS. 3–10 is made possible at least in part because the length of the electronic card 302 is greater than the width of the electronic card 300 and the set of pads 600 of the electronic card 300 are clustered along an end of an otherwise large surface of the electronic card 302 and are not susceptible to obstruction. However, in the event that the electronic cards 300 and 302 lack these features and overlapping is not possible, the alternate dual card reader, which is shown in FIGS. 12–17, is not dependent on these features and can be employed.

While the dual card reader 214 or the alternate dual card reader could be positioned elsewhere in the device 100, one skilled in the art will recognize that positioning the dual card reader 214 behind the slot 216 has some advantages. First, the battery pack 206, when connected, blocks the slot 216 and encloses the dual card reader 214 or the alternate dual card reader in the housing 102, thereby, protecting the dual card reader 214 or the alternate dual card reader from contaminates and accidental disengagement. This arrangement avoids incurring additional cost and complexity associated with a separate door device that would be needed to block a card reader access slot positioned elsewhere on the housing 102, such as along the junction 200. Also, the slot 216 location ensures that the electronic cards 300 and 302 can only be electrically connected to, or electrically disconnected from, the device 100 when the battery pack 206 is removed from the recess 208 and the device 100 is powered off. This prevents a user from possibly damaging the electronic cards 300 and 302, the device 100 or both by electrically disconnecting or connecting the electronic cards 300 and 302 while the device 100 is powered on.

Thus, it can be seen that the dual card readers described herein utilize an integrated drawer-housing structure with a single footprint to facilitate electrical connection of two different electronic cards to an electronic device and, thereby avoid the use of separate card readers. While particular embodiments of the present invention have been shown, described, and preferred, modifications may be made. For example, the track assembly could be modified so that the drawer is not completely detachable from the reader housing, thereby, reducing the opportunity for part loss. The track assembly has a reciprocal nature—the guides could be carried on the reader housing, while the tracks could be formed in the drawer. The drawer can be easily molded to employ a movable layer of material between the wells to facilitate longitudinal positioning of the electronic cards on the same side of the drawer. Although shown to be specifically incorporated into a cellular telephone, it will be recognized that the dual card readers may also be beneficially used in other portable devices including, but not limited to, two-way radios, radiotelephones, pagers, laptop computers, personal digital assistants, landline telephones, cordless telephones, and the like. It is therefore intended in the appended claims to cover all such changes and modifications which fall within the true spirit and scope of the invention.

What is claimed is:

1. A dual card reader comprising:

a reader housing;

a first set of contacts carried on the reader housing;

a second set of contacts carried on the reader housing; and a drawer for receipt by the reader housing, the drawer adapted to receive a first electronic card having a first size and a second electronic card having a second size different from the first size.

2. A dual card reader according to claim 1 further comprising:

a track assembly for slidably engaging the drawer and the reader housing, the track assembly comprising:

at least one track disposed in one of the reader housing and the drawer; and at least one guide carried on the other one of the reader housing and the drawer, the at least one guide adapted to be slidably received in the at least one track.

3. A dual card reader according to claim 2 wherein the reader housing has a base, the first set of contacts is carried on the base of the reader housing, the second set of contacts is carried on the base of the reader housing, the drawer has a first side; and further comprising:

a first well formed in the first side of the drawer to receive the first electronic card; and a second well formed in the first side of the drawer to receive the second electronic card, and whereby, upon engagement of the drawer and the reader housing, the first well is aligned with the first set of contacts and the second well is aligned with the second set of contacts.

4. A dual card reader according to claim 3 wherein the second well overlaps at least a portion of the first well.

5. A dual card reader according to claim 2 wherein the reader housing has first and second sides and first and second surfaces extending between the first and second sides, the first surface spaced apart from the second surface by a pocket, the first set of contacts is carried on the first surface of the reader housing, the second set of contacts is carried on the second surface of the reader housing facing the pocket, the drawer has first and second sides separated by a thickness greater than a sum of thicknesses of the first and second electronic cards; and further comprising:

a first well formed in the first side of the drawer to receive the first electronic card; and a second well formed in the second side of the drawer to receive the second electronic card, and whereby, upon engagement of the drawer and the reader housing, the first well is aligned with the first set of contacts and the second well is aligned with the second set of contacts.

6. A dual card reader according to claim 5 further comprising:

a first opening extending through the drawer, the first opening positioned in the first well on the first side of the drawer and positioned outside of the second well on the second side of the drawer, the first opening, when both the first and second electronic cards are received, to permit ejection of the first electronic card; and a second opening extending through the drawer, the second opening positioned in the first well on the first side of the drawer and positioned in the second well on the second side of the drawer, the second opening, when one of the first and second electronic cards are received, to permit ejection of the one of the first and second electronic cards.

7. A dual card reader according to claim 2 wherein the at least one track comprises an angled segment, the angled segment being non-perpendicular to the first and second ends of the one of the reader housing and drawer, and the at least one guide comprises a cylindrical prong, the cylindrical prong having a diameter less than a height of the at least one track to promote insertion therein.

8. A dual card reader according to claim 1 further comprising:

at least one well formed in the drawer to receive one of the first and second electronic cards; and a spring finger assembly defining at least a portion of a side wall of the at least one well, the spring finger assembly, in an undeflected position, extending from the side wall to reduce a dimension of the at least one well to less than a corresponding dimension of the one of the first and second electronic cards.

9. A dual card reader comprising:

a reader housing having first and second ends, first and second sides, and a first surface;

a first set of openings formed in the first surface;

a first set of contacts carried on the reader housing, at least a portion of each one of the first set of contacts is positioned in a corresponding one of the first set of openings;

a second set of contacts carried on the reader housing;

a drawer having first and second ends and first, second, third and fourth sides, a first well formed in the first side of the drawer to receive a first electronic card;

a second well formed in the drawer to receive a second electronic card, the second well and the first well differing in volume, at least a portion of the second well overlying at least a portion of the first well; and a track assembly for slidably engaging the drawer and the reader housing, the track assembly having first and second tracks and first and second guides, the first and second tracks formed in one of corresponding ones of the first and second sides of the reader housing and corresponding ones of the third and fourth sides of the drawer, the first and second guides carried on the other one of the corresponding ones of the first and second sides of the reader housing and the corresponding ones of the third and fourth sides of the drawer, the first and second guides adapted to be received in corresponding ones of the first and second tracks.

10. A dual card reader according to claim 9 further comprising a second set of openings formed in the first surface of the reader housing; and wherein at least a portion of each one of the second set of contacts is positioned in a corresponding one of the second set of openings, at least a portion of the first well has a depth substantially equal to a sum of thicknesses of the first and second electronic cards, and the second well is formed in the first side of the drawer, the second well having a depth substantially equal to the thickness of the second electronic card, the second well positioned to coextend with the first well at the at least a portion of the first well, and whereby, upon engagement of the drawer and the reader housing, the first well is aligned with the first set of contacts and the second well is aligned with the second set of contacts.

11. A dual card reader according to claim 10 wherein the first well is defined by first and second longitudinally extending side walls spaced apart by a first distance, and the second well is defined by first and second transversely extending end walls spaced apart by a second distance, the second distance greater than the first distance.

12. A dual card reader according to claim 9 wherein the reader housing further has a second surface extending between the first and second sides opposite the first surface and at the second end, the second well is formed on the second side of the drawer, further comprising a second set of openings formed in the second surface of the reader housing, at least a portion of each one of the second set of contacts is positioned in a corresponding one of the second set of openings, and whereby, upon engagement of the drawer and the reader housing, the first well is aligned with the first set of contacts and the second well is aligned with the second set of contacts.

13. A dual card reader according to claim 12 further comprising:

a first opening extending through the drawer, the first opening positioned in the first well on the first side of the drawer and positioned outside of the second well on the second side of the drawer, the first opening, when both the first and second electronic cards are received, to permit ejection of the first electronic card; and a second opening extending through the drawer, the second opening positioned in the first well on the first side of the drawer and positioned in the second well on the second side of the drawer, the second opening, when one of the first and second electronic cards are received, to permit ejection of the one of the first and second electronic cards.

14. A dual card reader according to claim 9 wherein the first and second tracks are formed in corresponding ones of the first and second sides of the reader housing, each one of the first and second tracks comprise:
  a first segment extending perpendicularly from an opening at the first end of the reader housing,
  a second segment extending from the first segment at an angle of approximately 145 degrees with respect to the first segment, and
  a third segment extending from the second segment parallel to the first segment, and the first and second guides are carried on the corresponding ones of the third and fourth sides of the drawer, each one of the first and second guides comprise:
  a first cylindrical prong positioned on an upper half of each of the third and fourth sides of the drawer proximate to the first end of the drawer, and
  a second cylindrical prong positioned on a lower half of each of the third and fourth sides of the drawer proximate to the second end of the drawer.

15. A dual card reader according to claim 9 wherein the first electronic card is a flash memory card, and the second electronic card is a subscriber identity card.

16. An electronic device comprising:

a device housing having a slot formed therein;

a circuit board positioned in the device housing;

a microprocessor carried on the circuit board;

a plurality of pads carried on the circuit board and electrically connected to the microprocessor;

a dual card reader housing positioned on the circuit board in proximity to the slot;

a first set of contacts carried on the dual card reader housing and electrically connected to the plurality of pads;

a second set of contacts carried on the dual card reader housing and electrically connected to the plurality of pads; and a drawer slidably engaged to the dual card reader housing, the drawer having a first well to receive a first electronic card having a third set of contacts and a second well to receive a second electronic card having a fourth set of contacts, the drawer, in an engaged position, aligning the first well with the first set of contacts and aligning the second well with the second set of contacts thereby mating the first and third set of contacts when the first electronic card is received in the first well to enable access by the microprocessor to the first electronic card and mating the second and fourth set of contacts when the second electronic card is received in the second well to enable access by the microprocessor to the second electronic card.

17. An electronic device according to claim 16 wherein the dual card reader housing has a base aligned with the slot, the first and second set of contacts are carried on the base of the dual card reader housing, the drawer has a first side, and the first and second wells formed in the first side of the drawer, the second well overlapping at least a portion of the first well.

18. An electronic device according to claim 16 wherein
  the dual card reader housing has first and second sides and first and second surfaces extending between the first and second sides, the first surface spaced apart from the second surface by a first distance,
  the first set of contacts is carried on the first surface of the dual card reader housing,
  the second set of contacts is carried on the second surface of the dual card reader housing,
  the drawer has first and second sides separated by a first thickness greater than a sum of thicknesses of the first and second electronic cards, the first thickness less than the first distance,
  the first well formed in the first side of the drawer,
  the second well formed in the second side of the drawer; and further comprising:
  a first opening extending through the drawer, the first opening positioned in the first well on the first side of the drawer and positioned outside of the second well on the second side of the drawer, the first opening, when both the first and second electronic cards are received, to permit ejection of the first electronic card; and
  a second opening extending through the drawer, the second opening positioned in the first well on the first side of the drawer and positioned in the second well on the second side of the drawer, the second opening, when one of the first and second electronic cards are received, to permit ejection of the one of the first and second electronic cards.

19. An electronic device according to claim 16 further comprising a battery pack; and wherein
  the device housing comprises a recessed site for detachably receiving the battery pack,
  the slot is located in the recessed site, and
  a width of the recessed site at the slot is greater than a length of the drawer to permit complete disengagement of the drawer from the dual card reader housing and, thereby, remove the drawer from the device housing.

20. An electronic device according to claim 16 wherein the first electronic card is a flash memory card, and the second electronic card is a subscriber identity card.

* * * * *